United States Patent

Sato

[15] 3,701,910

[45] Oct. 31, 1972

[54] COMPENSATING CIRCUIT FOR VOLTAGE AND TEMPERATURE IN A TRANSISTOR CIRCUIT

[72] Inventor: Takayoshi Sato, Tokyo, Japan

[73] Assignee: Kabushikikaisha COPAL, Tokyo, Japan

[22] Filed: Nov. 19, 1970

[21] Appl. No.: 90,939

[30] Foreign Application Priority Data

Nov. 22, 1969 Japan ....................44/93724
Dec. 26, 1969 Japan ....................45/1617

[52] U.S. Cl...............................307/255, 307/310
[51] Int. Cl........................................H03k 17/00
[58] Field of Search.............307/310, 317, 288, 255; 331/176

[56] References Cited

UNITED STATES PATENTS

| | | | |
|---|---|---|---|
| 3,248,560 | 4/1966 | Leonard | 307/317 X |
| 3,376,516 | 4/1968 | Budts | 307/288 X |

*Primary Examiner*—John S. Heyman
*Assistant Examiner*—B. P. Davis
*Attorney*—Kelman & Berman

[57] ABSTRACT

Compensating circuit for voltage and temperature in a transistor circuit of complementary connection having an NPN type transistor and a PNP type transistor with its base connected to the collector of the NPN transistor. The voltage of the base of the NPN transistor is compared with the voltage of the emitter thereof so as to trigger the same so that the PNP transistor is triggered. The circuit comprises a first voltage dividing series circuit and a second voltage dividing series circuit. The first voltage dividing series circuit consists of a varistor diode and a resistor. The first series circuit is connected to the terminals of the electric source, so that the divided voltage of the varistor diode is applied to the emitter of the NPN transistor. The second voltage dividing series circuit consists of a varistor diode and a resistor. The second series circuit is connected to the terminals of the varistor diode of the first series circuit so that the divided voltage of the varistor diode of the second series circuit is applied between the base and the emitter of the NPN transistor. The variation in the voltage of the varistor diode in each of the first and the second series circuit due to the variation in the voltage of the electric source as well as the variation in the temperature is made small thereby permitting the NPN transistor to be stabilized.

2 Claims, 4 Drawing Figures

INVENTOR.

Takayoshi Sato

BY: Kelman and Berman

AGENTS

INVENTOR.
Takayoshi Sato
BY: Kelman and Berman
AGENTS

INVENTOR,
Takayoshi Sato
BY:

COMPENSATING CIRCUIT FOR VOLTAGE AND TEMPERATURE IN A TRANSISTOR CIRCUIT

BACKGROUND OF THE INVENTION

The present invention relates to a compensating circuit for voltage and temperature in a transistor circuit, and more particularly, to a compensating circuit for voltage and temperature in a transistor circuit of complementary connection having an electric source, an NPN type transistor and a PNP type transistor with its base connected to the collector of the NPN transistor while the emitter of the PNP transistor is connected to one terminal of the electric source and the emitter of the NPN transistor is connected to the other terminal of the electric source, the voltage of the base of the NPN transistor being compared with that of the emitter thereof so as to trigger the same thereby permitting the PNP transistor to be triggered upon triggering of the NPN transistor.

It is desirable in a transistor circuit of the type described above to compensate for the variation in the voltage of the electric source as well as the variation in the temperature of the elements in the circuit so as to properly actuate the circuit.

The triggering of the PNP transistor in the above described transistor circuit might be delayed even though the NPN transistor is triggered, if the voltage of the base of the NPN transistor is made equal to or higher than the voltage of the emitter of the PNP transistor thereby resulting in an erroneous operation of the circuit.

The present invention solves the above problems.

The present invention is particularly useful for use in an electronic shutter disclosed in U.S. Pat. application Ser. No. 63,214, filed on Aug. 12, 1970, although the present invention is advantageously used with a conventional TTL type electronic shutter and other electronic appliances in which erroneous operation of the transistors therein due to the variation in the voltage of the electric source thereof and the variation in the temperature must be avoided so that they can be properly operated.

SUMMARY OF THE INVENTION

The object of the present invention is to provide a novel and useful compensating circuit for voltage and temperature in a transistor circuit of the type described above which solves the above problems.

The above object is achieved in accordance with the present invention by the provision of a first voltage dividing series circuit and a second voltage dividing series circuit in the transistor circuit, the first voltage dividing circuit having a varistor diode and a first resistor connected in series thereto with the first varistor diode connected to the one terminal of the electric source and with the first resistor connected to the other terminal of the electric source while the junction of the first varistor diode and the first resistor is connectable to the emitter of the NPN transistor through a switch so as to apply a voltage divided by the first varistor diode from the voltage of the electric source to the emitter of the NPN transistor, a relatively large current being flown through the first voltage dividing series circuit to thereby reduce the variation in the voltage applied to the emitter of the NPN transistor by the first varistor diode due to the variation in the voltage of the electric source by virtue of the current-voltage characteristics of the varistor diode and the resistor in the voltage dividing series circuit, the second voltage dividing series circuit having a second varistor diode and a second resistor connected in series thereto with the second resistor connected to the one terminal of the electric source and with the second varistor diode connected to the junction of the first varistor diode and the first resistor while the junction of the second varistor diode and the second resistor is connectable to the base of the NPN transistor through a switch so that a voltage divided by the second varistor diode from the voltage of the first varistor diode is applied between the base and the emitter of the NPN transistor, the current flowing through the second voltage dividing series circuit being thus made relatively small thereby permitting the variation in the voltage of the second varistor diode due to the variation in the voltage of the electric source applied between the base and the emitter of the NPN transistor to be further reduced by virtue of the current-voltage characteristics of the varistor diode and the resistor in the voltage dividing series circuit so that the operation of the NPN transistor is stabilized. At the same time, the variation in the voltage of the first varistor diode due to the variation in the temperature applied to the emitter of the NPN transistor is made small with respect to the shifting of the current-voltage characteristics of a varistor diode per se due to the variation in the temperature by virtue of a relatively large current flowing through the first voltage dividing series circuit obtained by the current-voltage characteristics of the varistor diode and the resistor in the voltage dividing series circuit. The variation in the voltage of the second varistor diode due to the variation in the temperature which is applied between the base and the emitter of the NPN transistor is kept intermediate the shifting of the current-voltage characteristics of the varistor diode and the variation in the voltage applied to the emitter of the NPN transistor by the first varistor diode due to the variation in the temperature thereby permitting the variation in the triggering voltage between the base and the emitter of the NPN transistor due to the variation in the temperature to be compensated for by the variation in the voltage applied to the NPN transistor by the second varistor diode. Thus, the operation of the NPN transistor can be stabilized in a wide range of variation in the voltage of the electric source as well as in a wide range of variation in the temperature.

In the circuit described above, when the voltage appearing at the base of the NPN transistor is made equal to or higher than the voltage of the emitter of the PNP transistor, the PNP transistor is kept non-conductive until the voltage of the emitter of tne NPN transistor is lowered with respect to the voltage of the emitter of the PNP transistor by the amount of the resultant voltage of the base-emitter voltage of the PNP transistor and the collector-emitter voltage of the NPN transistor even though the NPN transistor is triggered, because the voltage of the base of the PNP transistor is considered to be the same as the voltage of the base of the NPN transistor by virtue of the diode connection between the base and the collector of the NPN transistor, the voltage of the base of the NPN transistor being equal to or higher than the emitter of the PNP transistor. Therefore, a time delay might occur in the triggering of the PNP transistor after the NPN transistor has been triggered, thus resulting in an erroneous operation of the circuit.

In accordance with a further feature of the present invention, a capacitor is provided in the circuit, one end of which is connected to the one terminal of the electric source while the other end is connected to the base of the NPN transistor. Thus, the capacitor is charged to a voltage appearing between the terminals of the second resistor in the second voltage dividing series circuit. The voltage thus charged in the capacitor is so determined that the voltage of the NPN transistor is lowered with respect to the voltage of the emitter of the PNP transistor by the amount of the voltage between the collector and the emitter of the NPN transistor. Since the triggering voltage between the base and the emitter of the NPN transistor is considered to be the same as the triggering voltage between the emitter and the base of the PNP transistor, they cancel each other so that the PNP transistor is triggered without delay upon triggering of the NPN transistor.

DETAILED DESCRIPTION OF THE PREFERRED EMBODIMENTS

Figure 1:
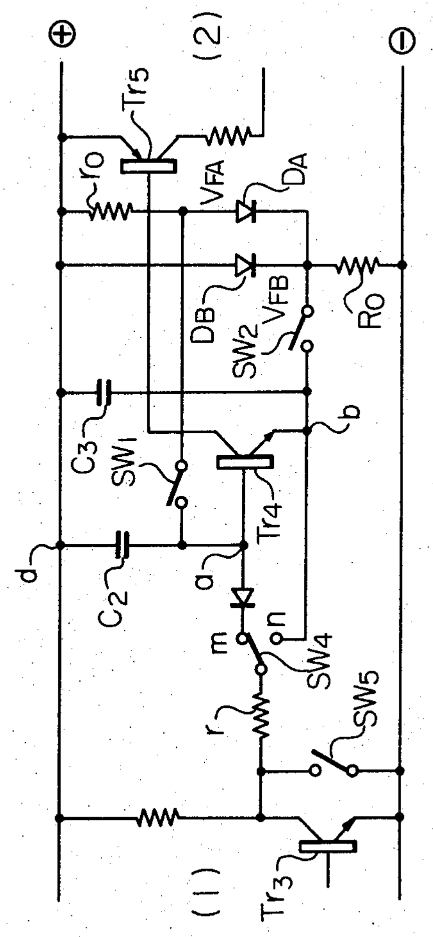
FIG. 1 is a diagram showing the transistor circuit of the present invention.

Referring to FIG. 1, the transistor circuit of the present invention comprises an electric source, an NPN type transistor $Tr_4$ and a PNP type transistor $Tr_5$. The collector of the transistor $Tr_4$is connected to the base of the transistor $Tr_5$, while the emitter of the transistor $Tr_5$ is connected to the plus terminal of the electric source, emitter of the transistor $Tr_4$ being connectable to the minus terminal of the electric source through a switch $SW_4$, a resistor *r* and a switch $SW_5$. The base of the transistor $Tr_4$ is selectively connectable through the switch $SW_4$ and the resistor r to the junction of a resistor and the collector of a transistor $Tr_3$, the resistor being connected to the plus terminal of the electric source while the emitter of the transistor $Tr_3$ is connected to the minus terminal of the electric source. The transistor $Tr_3$ is incorporated in a preceding stage of the circuit such as an integrating circuit of an electronic shutter as described later, while the collector of the transistor $Tr_5$ is connected to the succeeding stage of the circuit such as a switching circuit of the electronic shutter described later. One end of a capacitor $C_2$ is connected to the plus terminal of the electric source at *d*, while the other end is connected to the base of the transistor $Tr_4$ at a. One end of a capacitor $C_3$ is connected to the plus terminal of the electric source while the other end is connected to the emitter of the transistor $Tr_4$. During the time the transistor $Tr_3$ is made conductive with the switch $SW_5$ held opened and the switch $SW_4$ switched to contact m, the capacitor $C_2$ is charged. The capacitor $C_3$ commences to be charged when the switch $SW_4$ is switched to contact *n* and the switch $SW_5$ is closed while the capacitor $C_2$ is maintained in the charged state. The voltage of the capacitor $C_3$ given at *b* to the emitter of the transistor $Tr_4$ is compared with the voltage of the capacitor $C_2$ at a given to the base of the transistor $Tr_4$, so that, when the voltage between the base and the emitter of the transistor $Tr_4$ reaches the triggering voltage thereof, the transistor $Tr_4$ is rendered to be conductive so as to trigger the transistor $Tr_5$.

The triggering of the transistor $Tr_4$ is affected by the variation in the voltage of the electric source as well as the variation in the temperature of the elements in the circuit, and further, the triggering of the transistor $Tr_5$ might be delayed after the triggering of the transistor $Tr_4$ depending upon the voltage of the base of the transistor $Tr_4$ with respect to the voltage of the emitter of the transistor $Tr_5$ as described previously.

In accordance with the present invention, a first voltage dividing series circuit consisting of a varistor diode $D_B$ and a resistor $R_o$ and a second voltage dividing series circuit consisting of a varistor diode $D_A$ and a resistor $r_o$ are provided. The varistor diode $D_B$ is connected to the plus terminal of the electric source and the resistor $R_o$ is connected to the minus terminal of the electric source, while the junction of the varistor diode $D_B$ and the resistor $R_o$ is connected through a switch $SW_2$ to the emitter of the transistor $Tr_4$, so that a voltage divided by the varistor diode $D_B$ is applied to the emitter of the transistor $Tr_4$. The resistor $r_o$ is connected to the plus terminal of the electric source and the varistor diode $D_A$ is connected to the junction of the varistor diode $D_B$ and the resistor $R_o$, while the junction of the varistor diode $D_A$ and the resistor $r_o$ is connected through a switch $SW_1$ to the base of the transistor $Tr_4$, so that the voltage of the varistor diode $D_A$ is applied between the base and the emitter of the transistor $Tr_4$.

Figure 2:
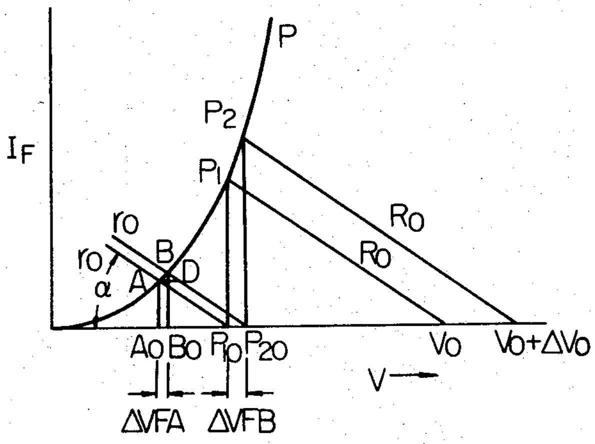
FIG. 2 is a diagram showing the current-voltage characteristics of a varistor diode and a resistor connected in series thereto to form a varistor-resistor series circuit.

Assuming that the voltage in the forward direction of the varistor diode $D_A$ is $V_{FA}$ and the voltage in the forward direction of the varistor diode $D_B$ is $V_{FB}$, the variation $\Delta V_{FB}$ in the voltage of the varistor diode $D_B$ and the variation $\Delta V_{FA}$ in the voltage of the varistor diode $D_A$ due to the variation in the voltage of the electric source from $V_o$ to $V_o + \Delta V_o$ are expressed by $P_{10}P_{20}$ and $A_oB_o$, respectively, in FIG. 2.

Points $P_1$, $P_2$ in the curve P are the intersecting points with the characteristics of the resistor $R_o$ in each of the varistor-resistor series circuits passing through point $V_o$, $V_o + \Delta V_o$, respectively, and points $P_{10}$, $P_{20}$ are projections of the points $P_1$, $P_2$ on the abscissa of the diagram, points A, B being the intersecting points of the curve P with the characteristics of the resistor $r_o$ in each of the varistor-resistor series circuits passing through the points $P_{10}$, $P_{20}$, respectively, while points $A_o$, $B_o$ are the projections of the points A, B on the abscissa of the diagram, respectively.

Thus, $$\Delta V_{FB} = P_{10}P_{20}$$

$$\Delta V_{FA} = A_oB_o$$

In FIG. 2, the curve P shows the current-voltage characteristics of the varistor diode and the straight lines $V_o$, $P_1$, $V_o + \Delta V_o$, $P_2$, $P_{10}$, A, $P_{20}$,B show the current-voltage characteristics of the resistor in the respective varistor-resistor series circuit, the resistor having the resistance $R_o$ or $r_o$ as shown.

Since a relatively large current flows through the varistor diode $D_B$ and the $dP/dV > 0$ and $d^2P/dV^2 > 0$ as shown in FIG. 2, the value $\Delta V_{FB}$ is made very small in comparison with the variation $\Delta V_o$ of the voltage of the electric source. Drawing a line from point A in parallel to the abscissa of the diagram and designating the intersecting point thereof with the characteristics B $P_{20}$ as D, then $AD = P_{10}P_{20} = \Delta V_{FB}$, and $AD$ is greater than $A_oB_o$ representing the value of $\Delta V_{FA}$, because $dP/dV > 0$ and the gradient of the characteristics B $P_{20}$ is negative, i.e., $\tan \alpha < 0$.

Thus, $AD > A_oB_o = \Delta V_{FA}$

Therefore, $\Delta V_o > \Delta V_{FB} > \Delta V_{FA}$

Thus, the variation in the voltage of the varistor diode $D_A$ applied between the base and the emitter of the transistor $Tr_4$ is made very small so that the transistor $Tr_4$ is adequately stabilized with respect to the variation in the voltage of the electric source.

Figure 3:
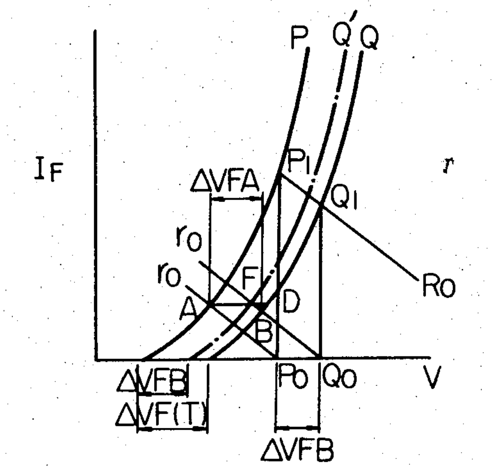
FIG. 3 is a diagram showing the variation in the current-voltage characteristics of the varistor diode and the resistor in the varistor-resistor series circuit due to the variation in the temperature.

Referring to FIG. 3, the curves P and Q show the forward current-voltage characteristics of the varistor diode at the temperature T and the temperature $T + \Delta T$, respectively. As shown, the curve Q is shifted from the curve P by the value of $\Delta VF(T)$. The variation in the voltage $\Delta V_{FB}$ of the varistor diode $D_B$ due to the variation $\Delta T$ in the temperature T is shown by $P_oQ_o$, points $P_1$, $Q_1$ being the intersecting points of the characteristics of the resistor $R_o$ of the varistor-resistor series circuit with the curves P, Q, respectively, while points $P_o$, $Q_o$ are the projections of the points $P_1$, $Q_1$ on the abscissa. Since the current flowing through the varistor diode $D_B$ is relatively large, the value $\Delta V_{FB}$ is made small.

Therefore, $\Delta VF(T) > \Delta V_{FB}$

The variation in the voltage $\Delta V_{FA}$ of the varistor diode $D_A$ is expressed by the horizontal distance between point A and point B, the point A being the intersecting point of the curve P with the characteristics of the resistor $r_o$ in the varistor-resistor series circuit passing through the point $P_o$, while the point B is the intersecting point of the curve Q with the characteristics of the resistor $r_o$ in the varistor-resistor series circuit passing through the point $Q_o$.

Curve Q' shows the characteristics of the varistor diode which is shifted from the curve P by the amount of $\Delta V_{FB}$. Drawing a line from the point A in parallel to the abscissa and designating the intersecting point with the curve Q' and the intersecting point with the curve Q as F and D, respectively.

Then, $AF = P_oQ_o = \Delta V_{FB}$ $AD = \Delta VF(T)$

Since $dQ/dV$ of the curve Q is positive, i.e., $dQ/dV > 0$ and the gradient of the characteristics of the resistor $r_o$ in the varistor-resistor series circuit is negative, projection of the point B on the line $AD$ falls intermediate the points F and the point D.

Thus, $VF(T) = AD > \Delta V_{FA} > AF = \Delta V_{FB}$

Therefore, the variation $\Delta V_{FA}$ in the voltage of the varistor diode $D_A$ due to the variation in the temperature is kept smaller than $\Delta VF(T)$ although it is greater than the value of $\Delta V_{FB}$.

The variation in the voltage of the varistor diode $D_A$ due to the variation in the temperature is considered to be the same as that of the transistor $Tr_4$ as the forward current of the varistor diode $D_A$ is reduced so that both act to cancel each other in the circuit. Since the current flowing through the varister diode $D_A$ is small, the operation of the transistor $Tr_4$ is stabilized even though the temperature varies.

The temperature characteristics of a transistor is, for example, 2.2 mV/oC while the temperature characteristics of a varistor diode is, for example, 1.8 mV/oC.

In accordance with a further feature of the present invention, the resistance of the resistor $r_o$ in the second voltage dividing series circuit is so determined that the voltage of the capacitor $C_2$ charged in accordance with the voltage appearing between the terminals of the resistor $r_o$ is effective to lower the voltage of the base of the transistor $Tr_4$ by the amount of the collector-emitter voltage of the transistor $Tr_4$ with respect to the voltage appearing at the emitter of the transistor $Tr_5$. Thus, the transistor $Tr_5$ is triggered without delay upon the triggering of the transistor $Tr_4$ for the reason previously described.

Figure 4:
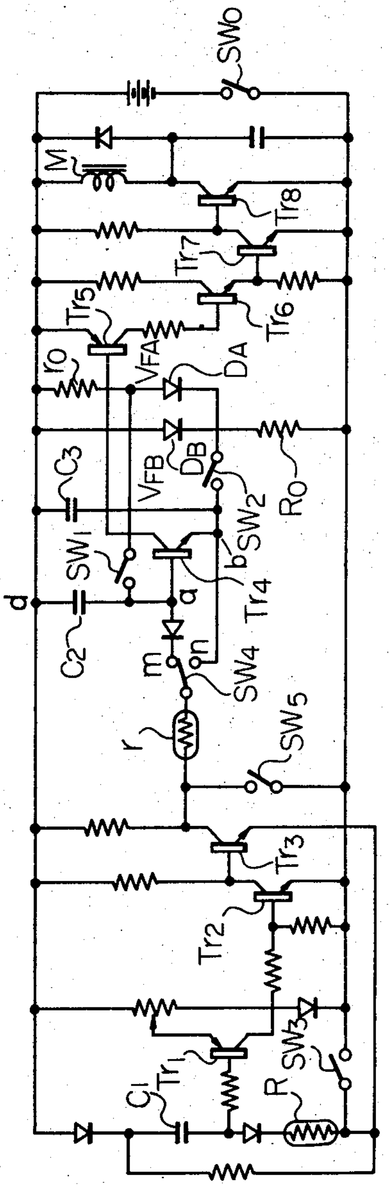
FIG. 4 is a diagram showing an electric circuit of an electric shutter in which the transistor circuit of the present invention is incorporated.

FIG. 4 shows an electric circuit of an electronic shutter in which the transistor circuit of the present invention is incorporated. Such an electric circuit is disclosed in the aforementioned U.S. Pat. application.

Briefly, the electric circuit shown in FIG. 4 comprises an integrating circuit consisting of a photoelectric element R for receiving the light from the object through an objective of the camera incorporating the shutter, a capacitor $C_1$ connected in series to the photoelectric element R to form a timing circuit for determining a reference time in accordance with the intensity of light from the object and transistors $Tr_1$, $Tr_2$ and $Tr_3$ which are triggered after the expiration of the reference time, a memory circuit consisting of an electrical element $r$ such as a photoelectric element for receiving the light from the object directly or a resistor, the above described capacitor $C_2$ selectively connectable to the electrical element r through a switch $SW_4$ to form a timing circuit and the above described NPN type transistor $Tr_4$, an exposure control circuit consisting of the capacitor $C_3$ selectively connectable to the electrical element $r$ by switching the switch $SW_4$ to form a timing circuit and the transistor $Tr_5$, and a switching circuit consisting of transistors $Tr_6$, $Tr_7$ and $Tr_8$ and an electromagnet M for maintaining shutter blades opened when energized, resistors and switches being incorporated as shown for properly actuating the shutter.

In accordance with the present invention, the first voltage dividing series circuit consisting of the varistor diode $D_B$ and the resistor $R_o$ and the second voltage dividing series circuit consisting of the varistor diode $D_A$ and the resistor $r_o$ are connected in the circuit as shown.

In operation, the switch $SW_0$ is first closed in the first stage of the operation of a release means in the camera to render the transistor $Tr_8$ to be conductive so as to be ready for preventing the trailing shutter blade from being closed by means of the electromagnet M. Then, switches $SW_1$ and $SW_2$ are closed during the operation of the release means to apply the divided voltage of the varistor diode $D_4$ between the base and the emitter of the transistor $Tr_4$ while the capacitor $C_2$ is charged to obtain the voltage appearing at the terminals of the voltage dividing resistor $r_o$. Then, the switch $SW_3$ is closed after the switches $SW_1$ and $SW_2$ have been opened so that the integrating circuit is made operative thereby making the transistors $Tr_1$, $Tr_2$ non-conductive while the transistor $Tr_3$ is made conductive during the reference time set by the capacitor $C_1$ and the photoelectric element R in accordance with the intensity of light from the object. During the time the transistor $Tr_3$ is conductive, the capacitor $C_2$ is charged through the electrical element *r* so that a reference voltage including the divided voltage previously given is set in the capacitor $C_2$ in accordance with the intensity of light from the object.

Upon further operation of the release means, the switch $SW_4$ is switched to contact *n* while the switch $SW_5$ is closed in coupled relationship with the opening of the leading shutter blade, the trailing shutter blade being prevented from being closed by the electromagnet M. Thus, the capacitor $C_3$ is charged through the electrical element *r*, so that the reference voltage applied to the base of the transistor $Tr_4$ is compared with the voltage given to the emitter of the transistor $Tr_4$ thereby permitting the same to be triggered when the voltage between the base and the emitter of the transistor $Tr_4$ reaches the triggering voltage thereof. When the transistor $Tr_4$ is triggered, the transistors $Tr_5$, $Tr_6$ and $Tr_7$ are made conductive while the transistor $Tr_8$ is rendered to be non-conductive, so that the electromagnet M is deenergized to close the trailing shutter blade thereby permitting the proper exposure to be obtained in accordance with the intensity of light from the object.

As previously described, the base-emitter voltage of the transistor $Tr_4$ is compensated for variation in the voltage of the electric source and the variation in the temperature in accordance with the present invention. Thus, proper operation of the shutter is insured.

One or more amplifying stages of the PNP transistors may be added to the transistor $Tr_5$. In this case, the voltage of the base of the transistor $Tr_4$ is lowered with respect to the voltage of the emitter of the transistor of the last stage by the resultant of the collector-emitter voltage of the transistor $Tr_4$ and the base-emitter voltage of the PNP transistor multiplied by the number of the amplifying stages added.

I claim:

1. Compensating circuit for voltage and temperature in a transistor circuit of a complementary connection having an electric source, an NPN type transistor and PNP type transistor, conductive means for connecting the base of said NPN type transistor and the collector of said PNP type transistor to preceding and succeeding stages of said circuit respectively, the collector of said NPN type transistor being connected to the base of said PNP type transistor with the emitter of said PNP type transistor connected to one terminal of said electric source while the emitter of said NPN type transistor is connected to the other terminal of said electric source for comparing the voltage of the base of said NPN type transistor with that of the emitter thereof so as to trigger the same, thereby permitting said PNP type transistor to be triggered, wherein the improvement comprises a first voltage dividing series circuit consisting of a first varistor diode and a first resistor connected in series thereto with said varistor diode connected to said one terminal of said electric source and with said first resistor connected to said other terminal of said electric source while the junction of said first varistor diode and said first resistor is connectable to the emitter of said NPN type transistor through a switch, and a second voltage dividing series circuit consisting of a second varistor diode and a second resistor connected in series thereto with said second resistor connected to said one terminal of said electric source and with said second varistor diode connected to the junction of said first varistor diode and said first resistor, the junction of said second varistor diode and said second resistor being connectable to the base of said NPN type transistor through a switch, thereby permitting the voltage between the base and the emitter of said NPN type transistor to be compensated for with respect to both the variation in the voltage of said electric source and the variation in the temperature by virtue of said first and said second varistor diodes.

2. Compensating circuit according to claim 1, wherein the improvement further comprises a capacitor with one end thereof connected to said one terminal of said electric source and with the other end connected to the base of said NPN type transistor thereby permitting said capacitor to be charged to the voltage between the terminals of said second resistor in said second voltage dividing series circuit, the voltage of said capacitor thus charged being so determined that the voltage of the base of said NPN type transistor is lowered with respect to the voltage of the emitter of said PNP type transistor by the voltage between the collector and the emitter of said NPN type transistor, thereby permitting said PNP type transistor to be triggered without delay upon triggering of said NPN type transistor.

* * * * *